INVENTOR.
ROBERT C. HUPP

March 20, 1962 R. C. HUPP 3,025,878
MOUNTING PANEL FOR FLUID CONTROL COMPONENTS
Filed June 2, 1959 3 Sheets-Sheet 2

INVENTOR.
ROBERT S. HUPP
BY Woodling + Krost
ATTORNEYS

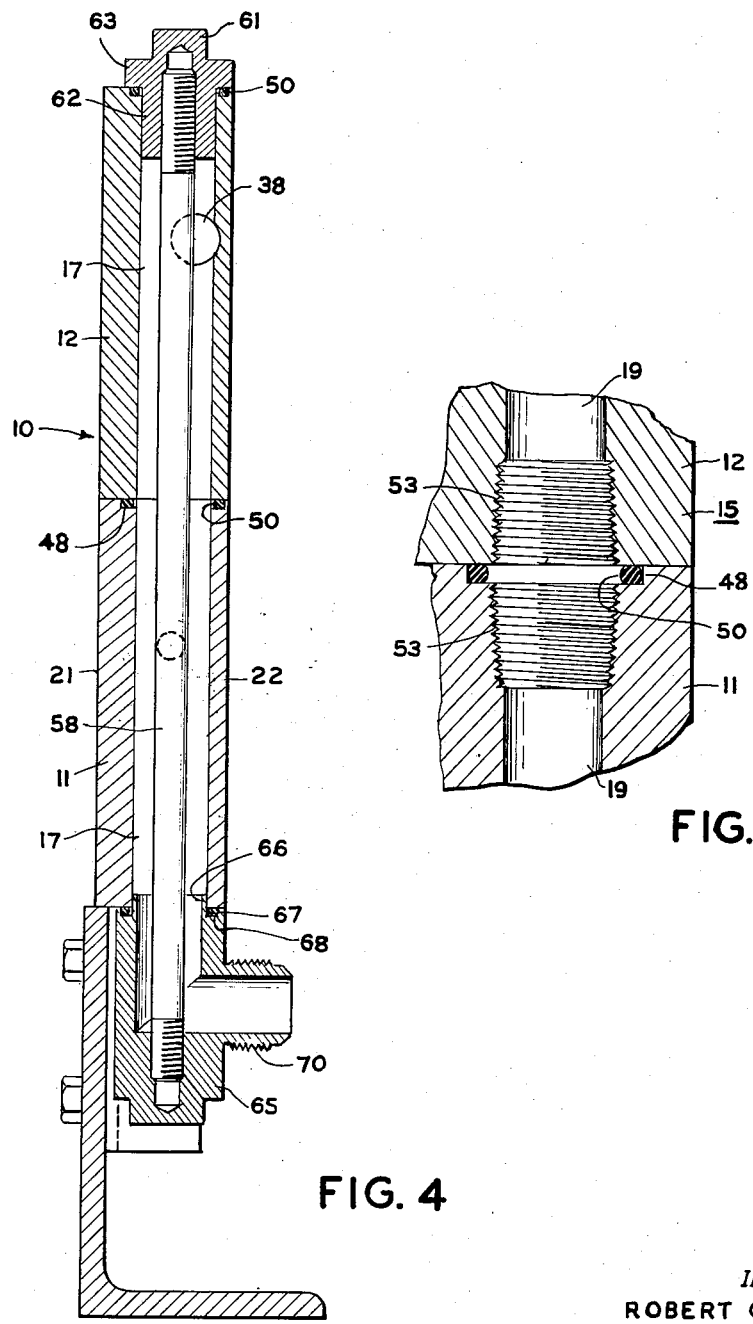

United States Patent Office 3,025,878
Patented Mar. 20, 1962

3,025,878
MOUNTING PANEL FOR FLUID CONTROL COMPONENTS
Robert C. Hupp, 422 N. Main St., Lapeer, Mich.
Filed June 2, 1959, Ser. No. 817,658
6 Claims. (Cl. 137—622)

The invention relates in general to a mounting panel which is made up of a plurality of subplate mounting blocks each of which mounts fluid control components and common fluid passages which provide a convenient method of collecting common pressure inputs, return outputs etc., which in turn eliminate much piping and many pipe joints and similar connections.

It will be readily appreciated that in addition to eliminating much of the piping and pipe connection work, the present invention eliminates the high cost of having such work done.

The concept in prior art panels has been to design the panel for a specific circuit application which involves an individual engineering layout whereas in the present invention the panel is built up from a plurality of standard or catalogue manufacturing blocks and standard associated components. In other words the mounting blocks of the present invention may be subsequently re-used in assembling other panels whereas prior art panels have only one specific circuit use to which they may be put.

Another object of the invention is to provide a panel made up of a plurality of manufacturing blocks which blocks when assembled in edge to edge relationship automatically connect in proper relationship manifolded common fluid passages.

Another object of the invention is to provide a panel made up of a plurality of mounting blocks secured together by tie rods passing through common fluid passages. This eliminates the necessity of providing additional holes for the rods and reduces the physical size of the blocks and as a result the cost. The center of force of the fluid pressure against the manifolded passage closures coincides with the axis of the tie rods restraining the passage closures thus eliminating an objectionable force couple between the two which would exist if this were not the case.

Another object of the invention is to provide a tie rod nut which also accomplishes the function of acting as an end closure for the manifolded fluid passages and a pilot for the tie rod in the fluid passage.

Another object of the invention is to provide a tie rod elbow which also accomplishes the function of acting as a pilot for the tie rod in the fluid passage as well as an aimable or angularly adjustable adapter for external fluid connection.

Another object of the invention is to provide a new method of providing the initial compression of an O-ring.

Another object of the invention is to provide a new and novel sealing assembly.

Other objects and a fuller understanding of this invention may be had by referring to the following description and claims, taken in conjunction with the accompanying drawings, in which:

FIGURE 4 is a sectional view taken generally along the line 4—4 of FIGURE 1;

FIGURE 7 is an enlarged fragmentary section of the drain passage shown in FIGURE 1.

Figure 1:
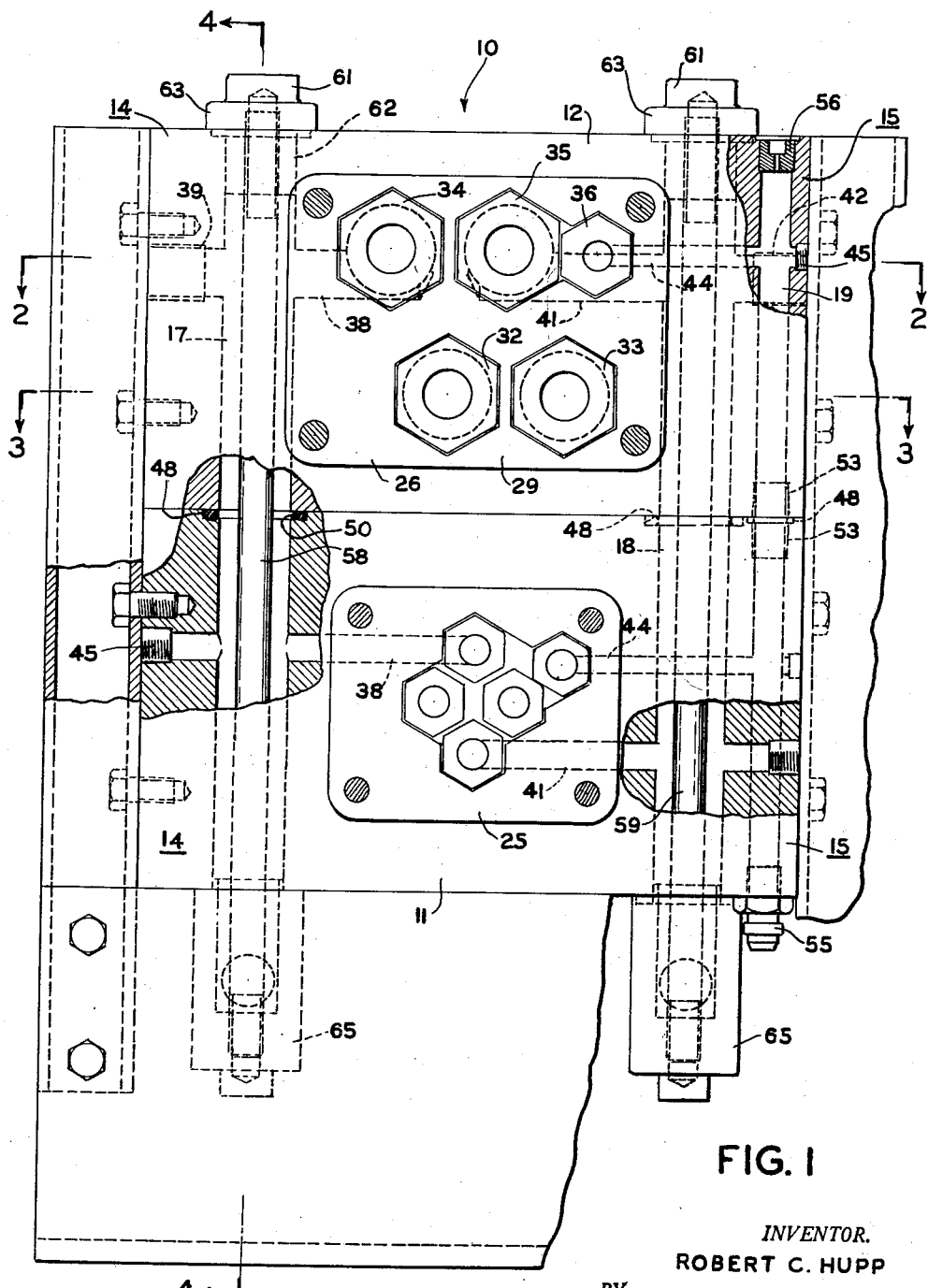
FIGURE 1 is an elevational view of a mounting panel constructed under the teachings of the present invention and comprising two subplate mounting blocks.
Figure 3:
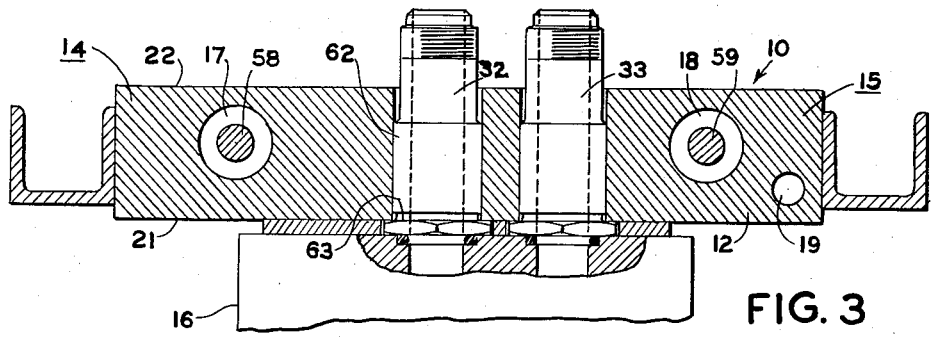
FIGURE 3 is a sectional view taken along the line 3—3 of FIGURE 1.

The mounting panel of the present invention shown in FIGURE 1 comprises for the sake of illustration, first and second panel blocks 11 and 12. It will be appreciated by those skilled in the art, after a detailed discussion of the figures shown in the present application, that a mounting panel may be made up of any number of panel blocks within reason, however, the same is best illustrated by the use of two panel blocks. The mounting panel shown herein has been indicated generally by the reference number 10. The panel blocks shown herein are adapted for mounting fluid control components on the front face thereof and as a specific illustration, hydraulic valves 16 are shown mounted thereon. Each of the first and second panel blocks 11 and 12 comprise a generally rectangular metal member, in this instance constructed of aluminum although not necessarily so, and each of these panel blocks has what may be referred to as first and second side portions 14 and 15. The first side portion 14 of each of the first and second panel blocks is provided with a drilled opening which extends completely through the block from one edge to the other and this opening serves as a return output passage 17. The second side portion 15 of the panel blocks 11 and 12 are similarly provided with two drilled openings which serve as a pressure input passage 18 and a drain passage 19. These passages are generally common to most fluid components such as the valve 16. Each of the panel blocks is provided with a front face 21 and a rear face 22. The front face of the first panel block 11 is provided with a subplate mounting assembly 25 and the second panel block 12 has a similar assembly 26 thereon. Each of the subplate assemblies are similar in nature and are patterned after the disclosure made in United States Patent No. 2,826,436, issued March 11, 1958 in the name of Robert C. Hupp et al. and more specifically is in the nature of the construction shown in FIGURE 5. The subplate assembly 26 includes a lock plate 29 which has a plurality of hexagonal openings therein (in this instance five in number). The lock plate is suitably secured to the front face of the panel block 12. The lower two hexagonal openings in the lock plate 29 receive hexagonally headed insert members 32 and 33. These two insert members extend completely through the panel block 12 to the rear face thereof (FIGURE 3). Insert members 32 and 33 provide for fluid communication between the valve member 16 and tubing which leads to the hydraulic components controlled by the valve. The upper three hexagonal openings in the lock plate 29 receive hexagonally headed adapter members 34, 35, and 36. Adapter 34 provides fluid communication between the valve body and the return output passage 17 by means of a crossdrilled opening 38 which extends from the end of panel block 12 which end is suitably closed by a plug 39. Adapter 35 provides fluid communication between the valve and the pressure output passage 18 by means of a crossdrilled opening 41 from the opposite side of the panel block 12 which drilled opening is suitably closed in a similar manner by a plug 42. Adapter 36 provides fluid communication between the valve body and the drain passage 19 in a similar manner by means of a drilled opening 44 which is closed by a plug 45. The subplate assembly 25 which is mounted on the front face of the panel block 11 is similar to the subplate assembly 12 with the exception that the inserts and the adapters have been placed in different positions, however the crossdrilled openings which communicate with the pressure, return, and drain passages are all the same and have been indicated by the same reference numerals. The upper edge surface of each of the panel blocks 11 and 12 at each of the first and second side portions 14 and 15 is provided with a counterbore 48 which surrounds the return, pressure, and drain passages 17, 18, and 19 which extend completely through the side portions of the panel blocks. An O-ring 50 is provided in each of the counterbores 48 with the exception of counterbore 48 which surrounds the drain passage 19 on the upper edge of panel block 12. The O-rings and counterbores 48 in the upper edge surface of panel 11 serve to provide a fluid tight seal between the passages which extend between the two panel blocks at the juncture edge of the two blocks. Each end of the drain passage in each of the panel blocks 11 and 12 is provided with internal pipe threads 53 which enables the blocks to be interchangeable. It will be noted that the internal pipe threads 53 at the bottom of block 11 serve to provide connection with a fitting 55 which leads from the drain passage and the internal pipe threads in the drain passage at the top of block 12 receive a vent plug 56. This vent plug prevents a vacuum from forming in the drain line which allows for smoother flow therefrom.

The first and second panel blocks 11 and 12 are secured together by means of first and second tie rods 58 and 59 which extend through the return output passages 17 and the pressure input passages 18. The upper end portions of both tie rods are threaded and these threads secure the tie rods to tie rod nuts 61. The tie rod nuts 61 have a pilot portion 62 which extends into the pressure and return passages and acts to center or locate the tie rod within the passage. The tie rod nuts 61 are also provided with a shoulder 63 which overlies the counterbore 48 and serves to compress the O-ring 50 to provide a good fluid seal and to dead-end the through return and pressure passages in the outermost panel block. With the use of the tie rod nuts, the necessity of providing an auxiliary plate to close off the through passages in the panel blocks 11 and 12 is obviated. The lower or second end portion of each of the tie rods is threaded and these threads serve to secure the tie rods to an angularly adjustable tie rod elbow 65. The tie rod elbows 65 are provided with a pilot portion 66 which positions the elbows in their respective passages which in turn positions the tie rod itself. A fluid seal is accomplished between the matting surfaces of the tie rod elbows and the lower edge of the panel block 11 by means of an O-ring 67 which resides in an annular groove 68. Threads 70 are provided at one end portion of the tie rod elbow whereby fluid connection may be made either with a source of hydraulic pressure or with the return line to a hydraulic fluid reservoir.

Figure 2:
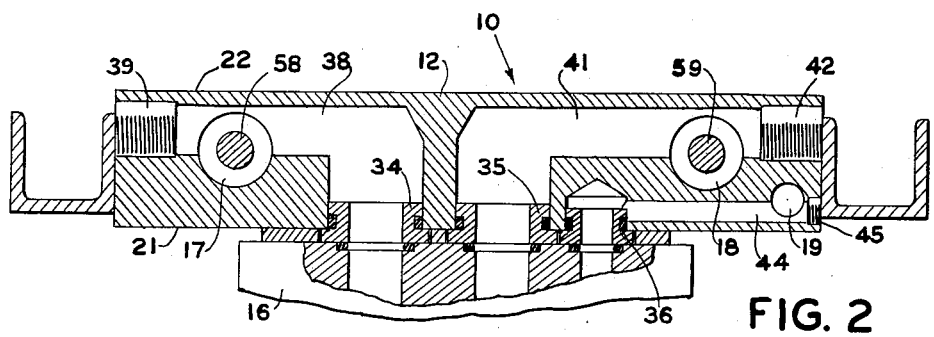
FIGURE 2 is a view taken generally along the line 2—2 of FIGURE 1.
Figures 5, 6:
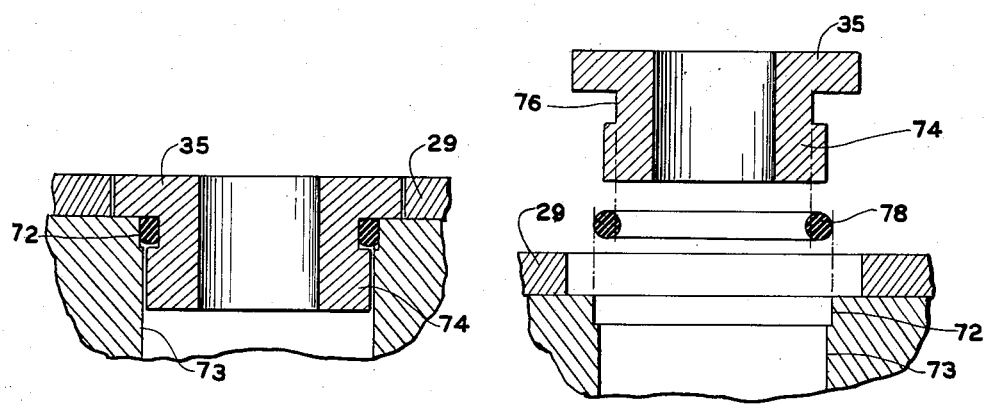
FIGURE 5 is an enlarged view of a sealing assembly utilized in the present invention and also shown in FIGURE 2.
FIGURE 6 is an exploded view of the sealing assembly shown in FIGURES 2 and 5.

FIGURES 5 and 6 show in detail the sealing assembly of which the hexagonally headed adapters 34, 35, and 36 shown in FIGURE 2 form a part. FIGURE 5 shows the sealing assembly enlarged from that shown in FIGURE 2 and in its assembled condition whereas FIGURE 6 shows the component parts thereof exploded or separated from each other. The sealing assembly includes wall means 72 which form a part of the pressure input passage 18 in panel block 12. The wall means or bore 72 is reamed as at 73 to a predetermined minimum depth, however the critical dimension is the diameter of the reamed bore and beyond a minimum depth anything deeper than this is not at all critical. The hexagonally headed adapter 35 is provided with a body portion 74 which resides in the bore 72 and between the body portion and the hex head an annular groove 76 is provided on the outside surface thereof. An O-ring 78 is maintained in the groove 76 and the wall of the reamed bore and the bottom of the groove serve to radially compress the O-ring to distort it into sealing engagement with the walls. FIGURE 6 illustrates how the initial compression is applied to the O-ring 78. It will be noted that the inside diameter of the O-ring in the free or unassembled condition thereof is smaller than the diameter of the groove 76. The free or unassembled dimension of the outside diameter of the O-ring is substantially equal to the diameter of the reamed bore. When the O-ring is put over the body portion of the adapter and into the groove 76, because of these dimensions, the inside diameter is increased and as a result the outside diameter is increased over that of the reamed bore. Insertion of the adapter into the bore 72 therefore causes the bottom of the groove and the reamed bore wall to radially compress the O-ring to distort the same into sealing engagement with the surrounding walls. The advantage of this type of O-ring mounting over the conventional counterbore type O-ring mounting is that the depth of the counterbore mounting is quite critical and comparatively difficult to hold. In the counterbore type of design the amount that must be bridged by the hex head is much greater than the distance that must be bridged in the design shown herein. The other as mentioned hereinabove is that the reamed bore of the present design is very readily accomplished as distinguished from the counterbore type of design which is difficult to hold.

In operation hydraulic fluid under pressure is introduced into the mounting panel from a source through the tie rod elbow 65 which is secured to the lower end portion of the tie rod 59. The fluid under pressure travels through the pressure input passage 18 in panel blocks 11 and 12 and specifically into valve 16 mounted on the front face of the second panel 12 through adapter 35. This fluid is then directed depending upon the position of the valve to a hydraulically operated mechanism through either insert 32 or 33 and is returned to the valve through the opposite insert. Hydraulic fluid then travels from the valve through adapter 34 to the return output passage 17 through tie rod elbows 65 secured to the lower end portion 58 and from there to the hydraulic reservoir. The same sequence of events occurs with regard to the valve which is mounted upon the face of panel block 11 and as a result no further discussion will be made thereof. In the event additional panels are stacked on top of the panels shown herein, a similar function or operation is carried out. It will also be appreciated that fluid control components other than valves may be mounted upon the panel blocks, however valves have been described herein for simplicity in understanding the invention. The drain line 19 serves as a convenient collecting method for the internal valve leakage.

It will therefore be apparent to those skilled in the art that by the assembling of a mounting panel by the use of a plurality of individual panel blocks, that a convenient method of collecting common pressure inputs, return outputs, drains, and etc. is provided which eliminates a great deal of the piping that previously had to be done as well as a great many of the pipe connections. For this construction the common passages are automatically connected by assembling the individual panel blocks, and since the blocks are standard or catalogue items, they will have a ready subsequent reuse as distinguished from prior art panels which are specially engineered to a specific circuit use. The provision of extending the tie rods through the manifolded common passages for securing the stacked panel blocks together in fluid type relationship has the advantage of locating the center of force of the fluid pressure in the passages against the passage closures whereby this center of force coincides with the axis of the tie rods themselves. This puts the force directly in line and eliminates the objectionable force couple which would occur in the event the center of the pressure force was located a distance from the center of the opposing force which in this instance is the center of the tie rod. Additionally with this construction the necessity of providing separate openings for the tie rods and the fluid passages is eliminated. The use of the tie rod nuts and the tie rod elbows serves the dual functions of locating the tie rods within the passages as well as forming either closures in the case of the tie rod nuts and in the case of the tie rod elbows by providing an aimable or angular adjustable adapter for external fluid connection.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A manifolding mounting panel for mounting hydraulic valves including in combination at least two panel blocks, each said panel block comprising a generally rectangular metal member having first and second side portions, a pressure input passage extending completely through said first side portion of said member, a return output passage extending completely through said second side portion of said member, each said panel block having a front and a rear face, means for mounting a hydraulic valve on said front face, passageway means connecting said hydraulic valve to said pressure input passage and to said return output passage, said at least two panel blocks being positioned together with the said pressure input passages and said return output passage in register with each other, first and second tie rods for securing said at least two panel blocks together, said first tie rod extending through said pressure input passages in said panel blocks and extending from one end thereof, said second tie rod extending through said return output passages in said panel blocks and extending from one end thereof, a tie rod nut threadably secured to said first end portion of each of said tie rods, each said nut comprising an internally threaded sleeve portion residing in said pressure and return passages respectively, said first end portion of each said tie rod being threaded and secured to said threads in said sleeve, each said nut having a shoulder portion overlying an O-ring residing in a counterbore in said first panel block, a tie rod elbow threadably secured to said second end portion of each of said tie rods, each said elbow having female threads for receiving the threads on said tie rod, each said tie rod elbow having means for connecting the same to an external line.

2. A mounting panel for mounting hydraulic components including in combination at least two panel blocks, each said panel block comprising a generally rectangular metal member having first and second side portions, a pressure input passage extending completely through said first side portion of each said member, a return output passage extending completely through said second side portion of each said member, each said panel block having a front face, means for mounting a hydraulic component on each said front face, passageway means connecting said hydraulic component to said pressure input passage and to said return output passage, said at least two panel blocks being positioned together with the said pressure input passages and said return output passage in register with each other, first and second tie rods for securing said at least two panel blocks together, said first tie rod extending through said pressure input passages in said panel blocks, said second tie rod extending through said return output passages in said panel blocks, a tie rod nut secured to said first end portion of each of said tie rods, a tie rod elbow secured to said second end portion of each of said tie rods, each said tie rod elbow having means for connecting the same to an external line.

3. A mounting panel for mounting fluid control components including in combination at least two panel blocks, each said panel block comprising a generally rectangular metal member having first and second side portions, a pressure input passage extending completely through said first side portion of said member, a return output passage extending completely through said second side portion of said member, each said panel block having a front face, means for mounting fluid control components on said front face, passageway means connecting said fluid control components to said pressure input passage and to said return output passage, said at least two panel blocks being positioned together with the said pressure input passages and said return output passage in register with each other, first and second tie rods each having first and second end portions for securing said at least two panel blocks together, said first tie rod extending through said pressure input passages in said panel blocks, said second tie rod extending through said panel blocks, a tie rod nut threadably secured to said first end portion of each of said tie rods, and means securing said second end portions of said tie rods in place to hold said at least two panel blocks together.

4. A hydraulic control panel for mounting control valves for a hydraulically actuated device in communication with a pressure, return and drain line system, said panel comprising a plurality of manifold blocks each of which has several fluid passageways formed therein for communication with one another and each of which manifold blocks has openings therein and each of which has secondary fluid passageways therein extending from some said first mentioned fluid passageways to some of said openings therein and means for holding said manifold blocks in side by side relation to one another with said first mentioned fluid passageways therein in liquid tight communication with one another, said means comprising tie rods positioned within said first-mentioned fluid passageways and extending through said manifold blocks and fasteners including closure members on said tie rods.

5. A hydraulic control panel for mounting control valves for a hydraulically actuated device in communication with a pressure, return and drain line system, said panel comprising a plurality of manifold blocks each of which has a plurality of fluid passageways therein arranged in axial alignment with one another to form common fluid passageways extending through said manifold blocks and each of which manifold blocks has sealing means around said passageways and between said blocks and each of which blocks has a plurality of openings therein and a plurality of secondary passageways in said blocks communicating with said first mentioned passageways and some of said openings and tie rods extending through some of said passageways and securing said manifold blocks in assembled relation.

6. A hydraulic control panel for mounting control valves for hydraulically actuated device in communication with a pressure, return and drain line system, said panel comprising a plurality of manifold blocks each of which has a plurality of openings therein and a plurality of passageways therethrough arranged in axial alignment with one another to form common passageways extending through said manifold blocks, some of said common passageways forming said pressure, return and drain lines in the hydraulic system and others of said common passageways defining longitudinal openings extending axially through said manifold blocks, tie rods positioned longitudinally within and extending through said last mentioned passageways and fittings incorporating fluid passageways on the ends of said tie rods holding said manifold blocks in fluid tight relation to one another, each of said manifold blocks having secondary passageways therein communicating with said first mentioned passageways and with some of said openings whereby said control valves may be positioned on said blocks in communication with said openings and placed in communication with said first mentioned passageways.

References Cited in the file of this patent
UNITED STATES PATENTS

| | | |
|---|---|---|
| 2,342,398 | Heron | Feb. 22, 1944 |
| 2,557,360 | Penella | June 19, 1951 |
| 2,804,883 | Curlett | Sept. 3, 1957 |
| 2,868,227 | Stephens | Jan. 13, 1959 |